June 26, 1934.  M. SHETLER  1,964,302
WATER SOFTENING APPARATUS
Filed May 31, 1929  4 Sheets-Sheet 1

INVENTOR.
Melvin Shetler
BY
[signature]
ATTORNEY.

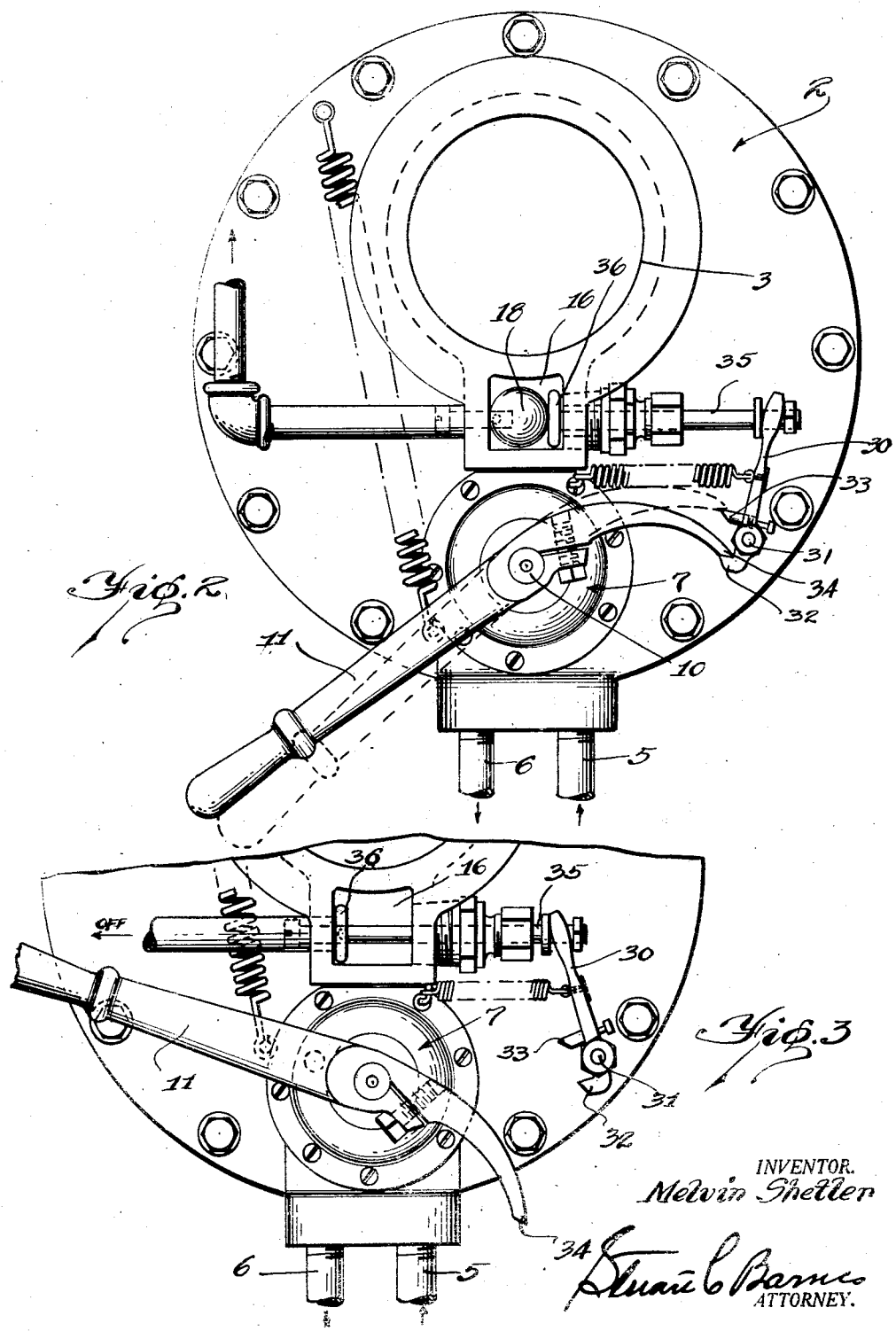

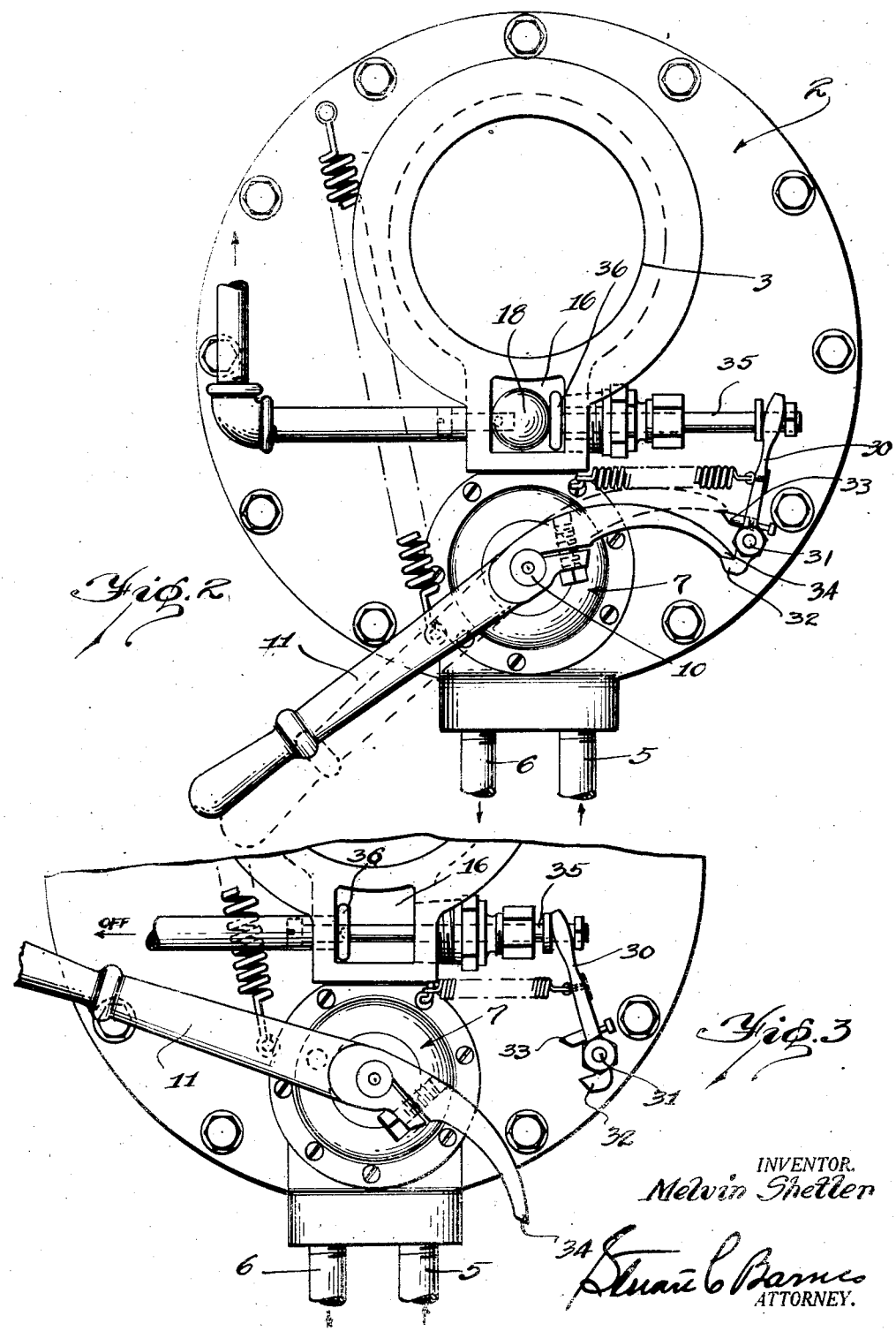

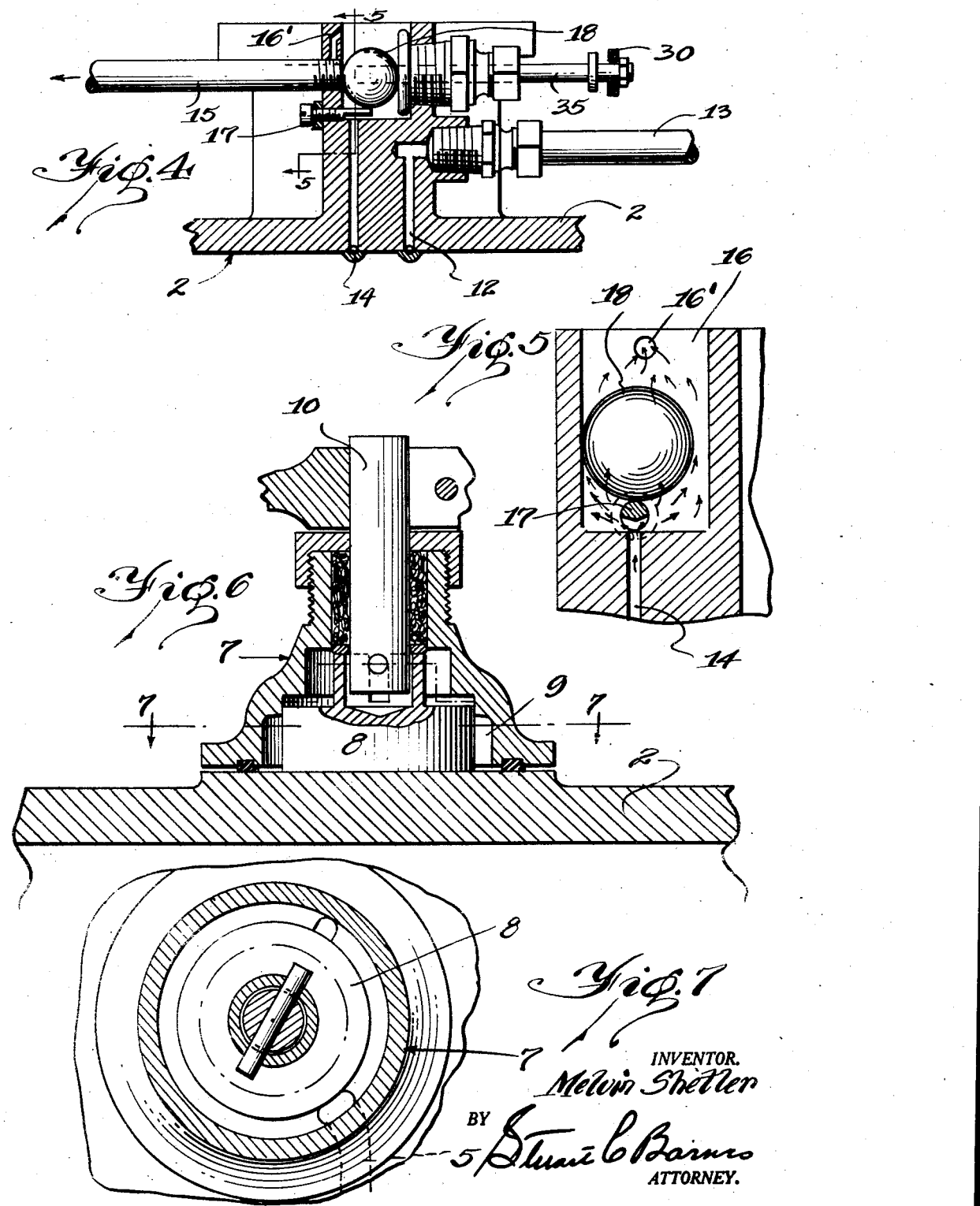

Patented June 26, 1934

1,964,302

UNITED STATES PATENT OFFICE 1,964,302

WATER SOFTENING APPARATUS

Melvin Shetler, Flint, Mich.

Application May 31, 1929, Serial No. 367,295

16 Claims. (Cl. 210—24)

This invention relates to water softening apparatus, and has to do particularly with a simple, inexpensive, and novel method of and apparatus for controlling the softening of the water and regeneration and washing of the softening means.

The present invention relates specifically to the manually operative type of water softener, and preferably to a water softener embodying a single softening tank. Heretofore, in the use of manually operative water softeners, it has generally been the custom to provide a softening tank and a regenerating or brine tank, but in addition to being relatively expensive, such softening apparatus has been objectionable due to the necessity of depending upon the human element to turn on or off the various valve and operative parts at the proper time.

The proper timing and bringing into play of the various parts has been the source of much trouble in softening apparatus of all types. The present invention relates particularly to a single softening tank, eliminating the brine tank, and making the softening tank automatic and positive in the sequence of operations after the initial operation of setting the device for a charge of regenerating material. More specifically, the regeneration of the softening tank, in the present invention, is controlled by stopping the normal flow of hard water to the softener, placing the charge of regenerating material in the tank, and controlling the regenerating period by the amount and nature of the flushing liquid discharged from the softening tank.

In this case, the only manual operation necessary is the placing of the charge of regenerating material and the setting of the apparatus to regenerating position, the regenerating and flushing period and the return of the apparatus and system to normal operation being completely automatic.

Another feature of the present invention resides in the novel means and manner of controlling the regenerating period by the insertion of means in the overflow or flushing line which will be gradually dissolved or affected by such flushing liquid whereby as soon as such means is dissolved or otherwise affected, the operating parts will be automatically changed from regenerating and flushing position to normal position.

Other features of the invention include various details of construction and the simplicity of operating parts and arrangement thereof, as will be more clearly brought out in the specification and claims.

In the drawings:

Fig. 2 is a plan view of the structure shown in Fig. 1, and showing particularly the manner of controlling the flushing period.

Fig. 3 is a fragmentary detail view similar to Fig. 2, and showing the control lever as being released and returned to normal operating position.

Fig. 4 is a fragmentary vertical sectional view taken through the pocket for receiving the control pill and also showing the course of flow of the flushing liquid.

Fig. 5 is an enlarged sectional view taken on line 5—5 of Fig. 4, and illustrating the manner of controlling the flow of flushing liquid so as to variably control the dissolving of the pill to regulate the time of the flushing period.

Fig. 6 is an enlarged fragmentary vertical sectional view taken through the valve housing.

Fig. 7 is a view taken on line 7—7 of Fig. 6.

Fig. 8 is a bottom plan view of the valve insert or movable control member for the valve housing.

Fig. 9 is a sectional view taken on line 9—9 of Fig. 8.

Fig. 10 is a sectional view taken on line 10—10 of Fig. 8.

Fig. 11 is a sectional view taken on line 11—11 of Fig. 8.

Fig. 12 is a diagrammatic view similar to Fig. 7 but showing the valve insert in dotted lines to show the corresponding parts of the various ports when the valve is in normal operating position.

Fig. 13 is a view similar to Fig. 12, but showing the valve being rotated to closed charging position.

Fig. 14 is a view similar to Fig. 12 showing the valve turned to regenerating and flushing position.

Figure 1:
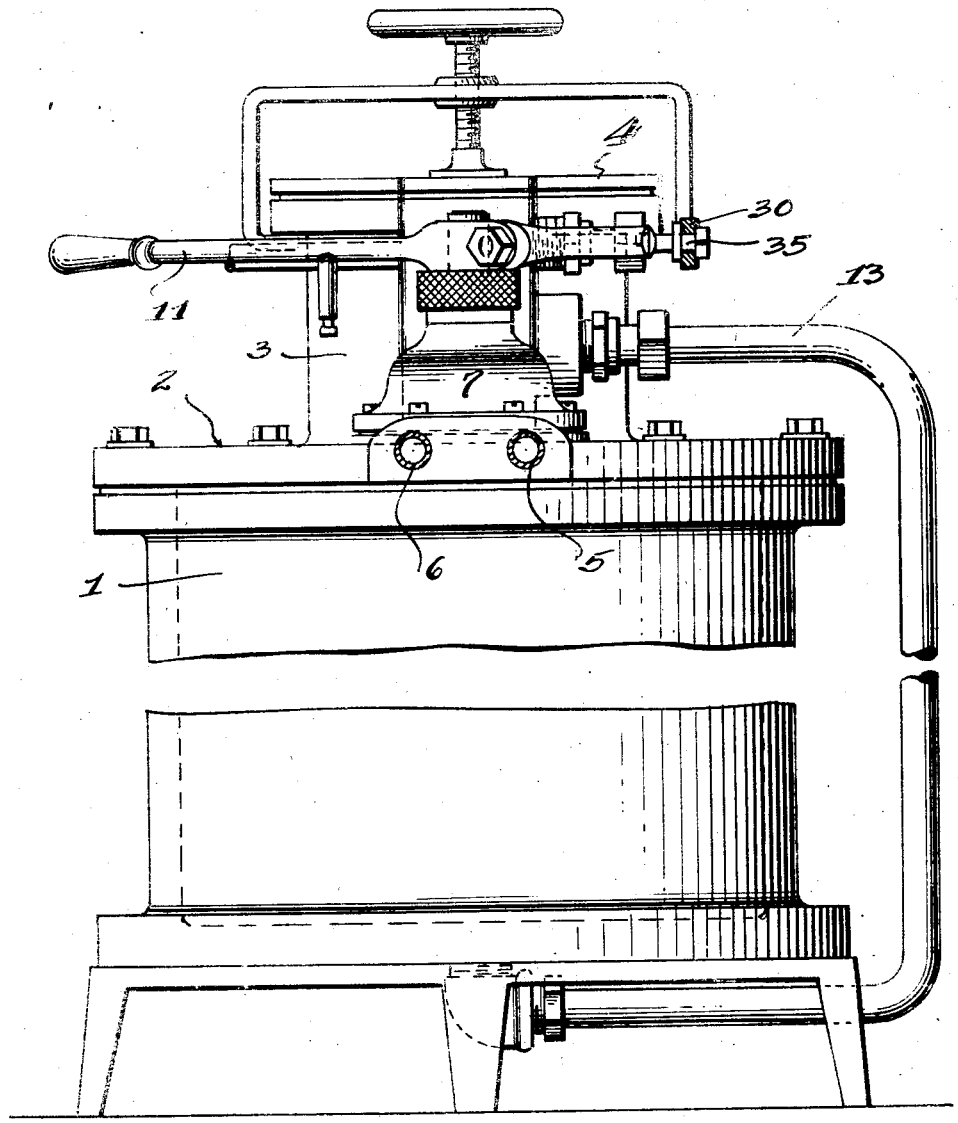
Fig. 1 is a front elevation of a water softening tank embodying the present invention, and showing in particular the operating parts for controlling the flow of liquid through the softener.

While I have shown and described the present invention as being embodied in a single tank, extremely simple, water softening apparatus, it will be understood that the structure and method herein described is equally well adapted to other and much more complicated and expensive softening systems.

Any suitable softening tank 1 may be utilized in carrying out the invention, and on top of such tank 1 I preferably provide a novel head member which may be generally designated 2. This head member 2 preferably includes or carries all of the operating structure and passageways for controlling the normal softening operations together with the regenerating and flushing operations.

This head may be bolted to the top of the tank as shown, and preferably comprises an inlet opening 3 through which the charge of salt or other regenerating material is adapted to be inserted. Any suitable cover member 4 may be utilized in closing the top of this inlet opening, so as to quickly and easily permit the insertion of a charge of regenerating material either in bulk form or in the form of any suitable cylinder.

The head member 2 is fabricated to provide suitable inlet and outlet passageways 5 and 6 which communicate with suitable passageways formed by means of a suitable valve and valve housing which may be generally designated 7. The passageways 5 and 6 terminate at suitable points beneath or adjacent a rotary valve insert 8 which, as best shown in Fig. 6, is rotatably positioned within the valve housing and provides a suitable annular space 9 between the member 8 and the outer wall of the housing. This valve member 8 is adapted to be oscillated through movement of a suitable shaft 10 connected to an actuating lever 11, as will be later described.

Positioned back of the valve housing 7, as best shown in Figs. 2, 3, and 4, the head member is formed to provide an outlet passageway 12 which has its origin adjacent the valve member 8 whereby to conduct the fresh hard water through a suitable conduit 13 to the bottom of the softening tank. Another passageway 14 is also formed in the head member 2 and also has its origin adjacent the valve member 8 whereby in a set position of such valve member it is adapted to conduct the flushing liquid to an overflow conduit 15.

This conduit 14 in the head 2 terminates in a pocket 16 which is adapted to receive a suitable pill or similar member for the purpose of controlling the regenerating and flushing period, as will be later described. The point where this conduit 14 enters the pocket 16, as best shown in Figs. 4 and 5, is obstructed by a member 17 which may be in the form of a set screw flattened off as shown, whereby to deflect the outgoing flushing liquid to either side of the pill 18 so as to regulate the time of dissolving of the pill. In other words, as this member is turned so that the outgoing flushing liquid is directed to more or less directly hit the pill, it will be obvious that the dissolving time of the said pill will be materially shortened.

It will be obvious that any suitable valve mechanism may be utilized for controlling the flow of water to and from the valve mechanism and through the tank or through the overflow passageway. In Figs. 8 to 13, inclusive, I have shown somewhat diagrammatically a valve structure and manner of operating the same to control the flow of water, as desired. In Fig. 8, I have shown the valve member 8 in bottom plan view where it is shown as being provided with two longitudinal depressions 19 and 20, a spring pressed valve disc 21, and a right angle passageway 22 providing a connection between the side and bottom of said valve disc 8.

In Figs. 12, 13, and 14, the valve insert 8 is shown in dotted lines as being positioned on top of the plate 2. The plate itself is formed with a depression 23 which is adapted to connect the depression 20 of the valve disc with an inlet port 24 which is adapted to receive the fresh hard water from the inlet 5 and around the annular passageway 9, as best shown in Fig. 6. An outlet passageway 25 which extends directly through the plate 2, and another outlet passageway 26 which is connected to the main softening outlet passageway 6 are positioned to cooperate with the depression 10.

The plate 2 is also provided with a port or aperture 27 which conducts the incoming fresh water to the passageway 12 which leads to the bottom of the tank through the conduit 13, as best shown in Fig. 4. This plate is also provided with a small aperture 28 which leads directly to the top of the tank, and a small aperture 29 which leads to the passageway 14 for conducting the flushing liquid from the tank.

The mechanical structure for controlling the positioning of this valve member is best shown in Figs. 1, 2, and 3. The shaft 10 of the valve member is directly connected to the lever 11, which may be manually moved from the normal position shown in Fig. 3 to the loading position shown in dotted lines in Fig. 2.

A suitable lever 30 is pivotally mounted as at 31 and this lever is provided with a main catch 32 and an independent spring backed catch 33. In moving the lever from normal position, as shown in Fig. 3, in a counter clockwise direction, it will be obvious that the end 34 of such lever will be moved backwardly to a point where it contacts with the spring pressed catch 33, as shown in dotted lines in Fig. 2. This may be termed the off position of the apparatus, and in this position the lever 30 is preferably moved outwardly to the position shown in Fig. 2.

The end of the lever 30 may be bifurcated so as to embrace the end of a plunger 35, and the end of such plunger 35 is provided with a suitable disc 36 for contact with the timing pill 18. In other words, when such plunger 35 is moved outwardly, it will be obvious that a suitable pill 18 may be dropped into the pocket 16. As the plunger 35 is moved outwardly and the pill 18 placed in the pocket to hold such plunger in its outward position, it will be seen that the end 34 of the lever 11 will come into contact with the catch 32 so as to maintain the valve in the solid line position, as shown in Fig. 2, which is the regenerating and flushing position; said lever being released by manual movement of the catch 33 or by movement of the lever 30 itself.

The relative positions of the valve member 8 corresponding to the three positions of the lever 11 just described, are shown in Figs. 12, 13, and 14. Fig. 12 depicts the normal position of the valve wherein the hard water enters through the inlet 5, passes around through the passageway 9, through the depression 23 up into the valve disc 8 and then into the port 27 and out through the conduit 13 to the bottom of the tank where the water will rise up through the softening material and pass out through the ports 25 and 26 to the outlet conduit 6.

When the lever 11 is moved to "off" position, the valve disc 8 is moved to the position shown in Fig. 15, which is such that the various ports and passageways will completely shut off the flow of water in any direction. However, when the valve is rotated slightly to the position shown in Fig. 14, then the right angled port 22 in the valve disc is positioned over the outlet port 28 whereby the incoming hard water passes directly to the top of the softening tank for the purpose of flushing the salt or other regenerating material down through the bed of softening material. This flushing liquid having passed the bottom of the tank, it will then pass upwardly through the conduit 13 and be returned by way of the passageway 12 to the valve disc 8, where such flushing liquid passes through the depression 20, through the passageway 14 and through the pocket 16 to the outlet drain conduit 15.

The period that this flushing liquid is allowed to pass downwardly through the tank is predetermined by the time it takes the flushing liquid, in passing through the pocket 16, to dissolve the pill 18. The material used in such pill may vary considerably, and in practice I have found that the ordinary "jaw breaker" is ideally suited, as a standard "jaw breaker" usually dissolves in such a length of time as to insure that the bed of softening material is thoroughly cleansed. It will be understood, of course, that the material of the pill may be such as to dissolve in different lengths of time, in accordance to the degree of hardness of the water to be softened, and it will also be understood that the member 17 may be so adjusted as to vary the manner in which the outgoing stream of flushing water is directed against the pill so as to also vary the dissolving and hence the flushing period.

In operation, when it is noticed that the water passing through the system is becoming more or less hard, the user may remove the top 4 from the tank and move the lever 11 to its extreme off position, as shown by the dotted lines in Fig. 2, whereby the flow of water will be completely stopped. A charge of salt or other regenerating material may be then dumped into the opening in the tank so as to settle directly on top of the softening bed. The top may be then replaced and the plunger 35 withdrawn and a suitable pill placed in the pocket. The withdrawing of the plunger to the position shown in Fig. 2 will release the lever 11 so that it may be moved to the regenerating and flushing position which is the position shown in Figs. 2 and 14; or the lever 11 may be released by manual withdrawing of the catch 33. From this point on, the operation is completely automatic and it will be understood that the only human element required is the setting of the apparatus when it is desired to regenerate the softening material.

When the lever moves to regenerating and flushing position, it will be seen that the incoming water will pass through the valve structure directly to the top of the tank, whereby it will force the salt or other regenerating material down through the bed of softening material to regenerate the same. This action will be continued and the flushing liquid will pass upwardly through the conduit 13 back through the valve member and out through the pocket 16 containing the pill which will be gradually dissolved or otherwise washed away due to the overflow of the flushing liquid. After a predetermined time, when the pill has been dissolved, it will be obvious that the spring attached to the lever 30 will move the plunger and the lever to release the main lever 11 when it will automatically return to normal position to reverse the flow of water whereby the incoming hard water will pass to the bottom of the tank and up through the regenerated softening material towards the outlet service pipe.

It will thus be seen that I have provided a softening apparatus which is extremely simple, compact, and inexpensive, and which is as operative as any completely automatic system in that the only manual operation required is the setting or starting operation, the device having once been set it may be forgotten until the water again needs softening. It will thus be seen that I have entirely eliminated cleaning devices, float valves, and other complicated and expensive structures, because the only operation required is the simple operation of dropping a pill in place when the apparatus is set.

What I claim is:

1. Water softening apparatus of the type having means for controlling the successive operations of softening, regeneration, and flushing, comprising a softening tank, means for manually controlling the insertion of regenerating liquid and the initiating of the regenerating operation, means for controlling the flow of flushing liquid relative to said tank, and a dissolvable member placed in cooperating relation with said last named means for automatically controlling the length of the flushing operation by the amount of flushing liquid used to dissolve said member.

2. Water softening apparatus of the type having means for controlling the successive operations of softening, regeneration, and flushing, comprising a water softening tank, means for manually stopping the normal flow of hard water through the softening material, and then initiating the regenerating operation by starting the flushing liquid through the softening material in the opposite direction, a valve working in cooperation with said means for directing the flow of flushing liquid to the tank, and a valve control member of gradually changing size positioned in the liquid path and in cooperating relation with said valve for controlling the regenerating and length of the flushing period, said change in size being effected by contact of the flushing liquid with said member.

3. Water softening apparatus of the type having means for controlling the successive operations of softening, regeneration, and flushing, in a system where the normal flow of hard water is from the bottom upwards, comprising a softening tank means for manually stopping the flow of water and permit inserting a charge of regenerating material and starting the regenerating of the softening material by initially directing the hard water downwardly through the bed of softening material, and a member of predetermined dissolvability, placed in the line of flushing liquid at the beginning of the flushing operation and operatively connected to said means for controlling the length of the flushing period.

4. Water softening apparatus of the type having means for controlling the successive operations of softening, regenerating and flushing, comprising a softening tank, means for the manual placing of regenerating means on top of the softening material and regenerating the softening material by washing the regenerating means through the softening bed by incoming flushing liquid, means conducting the flushing liquid through a passageway towards a drain pipe, means for returning the apparatus to normal softening position and a dissolvable substance placed in operative relationship to said last named means and in dissolvable relation to the outgoing stream of flushing liquid for controlling the length of the flushing period.

5. Water softening apparatus comprising a softening tank, valve structure movable for controlling the flow of flushing liquid to the tank, a passageway for conducting the flushing liquid from the tank, means connected to the valve structure for returning the same to normal position, and means of changeable size placed in said passageway for the outgoing flushing liquid, said means being changed in size by direct contact therewith of the flushing liquid to control the operation of said valve control means.

6. Water softening apparatus comprising a softening tank, a valve structure movable to two separate positions for controlling the flow of water through the tank, one position of the valve causing the hard water to flow up through the softening material in the tank to soften the same, and the other position of the valve causing the hard water to flow through the softening material to first distribute the regenerating material and then flush the same, a conduit for said flushing liquid, dissolvable means positioned in said conduit, valve operating means contacting with said means and operable for moving the valve from the second to said first position and means for positioning said valve structure in a third position which completely shuts off the flow of any liquid to permit the regenerating material to be fed into the softening tank.

7. Water softening apparatus comprising a single tank having a charging opening, a valve structure movable to two separate positions for controlling the flow of water through the tank, one position of the valve causing the hard water to flow up through the softening material in the tank to soften the same, and the other position of the valve causing the hard water to flow through the softening material to first distribute the regenerating material and then flush the same, dissolvable means adapted to be positioned in said flushing line for temporarily preventing the return of the valve from its second position to said first position and means for positioning said valve structure in a third position which completely shuts off the flow of any liquid to permit the regenerating material to be fed into the softening tank.

8. Water softening apparatus comprising a single tank, a head for said tank including a charging opening and passageways for conducting water to and from the tank, a single valve structure for controlling the flow of liquid to and from the tank, means for manually setting the valve structure to permit charging of the tank with regenerating material through the charging opening and to direct incoming liquid through the tank as flushing liquid, and means for temporarily holding the valve in this position but reducible in size for automatically returning the valve structure to normal position after a predetermined length of time.

9. Water softening apparatus comprising a softening tank, a valve housing for controlling the flow of water in said tank, a valve member movable to reverse the direction of flow of water in the tank, a depression provided in the tank and located in the path of the water when the valve is rotated to reverse the flow of water, means in said depression adapted to temporarily hold said valve in reversed position and means for automatically returning the valve to normal position after a predetermined flow of water through said depression.

10. Water softening apparatus, comprising a softening tank, a head for said tank comprising a charging opening and a valve housing for controlling the flow of water through said tank, a movable valve seat in said housing, a pocket in said head, and passageways in said head connecting said pocket with said seat, a movable member in said pocket adapted to receive a dissolvable pill, and means connecting said movable member and said movable seat, said means being manually movable to start the regenerating and flushing period, said valve seat, when moved, being adapted to conduct flushing water through said pocket whereby to automatically return the valve to normal position and control the flushing operation by the time required to dissolve said pill.

11. Water softening apparatus of the type having means for controlling the successive operations of softening, regeneration, and flushing, comprising means for manually controlling the insertion of the regeneration material and the initiating of the regenerating operation, and a member of predetermined dissolvability, placed in the line of flushing liquid at the beginning of the regenerating operation for automatically controlling the length of the regenerating and flushing operation.

12. Water softening apparatus of the type having means for controlling the successive operations of regenerating and softening, comprising means for manually stopping the normal flow of hard water through the softening material and initiating the regenerating operation by starting the regenerating substance through the softening material in the opposite direction, and a timing cube or pill of a predetermined size and quality adapted to be placed in a line of flow of liquid for automatically controlling the regenerating and flushing period.

13. Water softening apparatus, comprising a softening tank, valve structure for controlling the flow of water to and from said tank, said structure being movable to divert the flushing liquid from the normal line during and after the regenerating operation, and means operatively connected with said structure and including a dissolvable member positioned in the path of flushing liquid whereby when the member is dissolved by the flushing liquid said means will be operable to return the valve structure to its normal position.

14. Valve structure of the type described, comprising a valve part manually movable to one position for permitting the flow of liquid through a conduit, means tending to move said valve part to another position to change said flow of liquid, and means positioned in the path of said liquid for temporarily holding said valve in said first position but changeable in size by contact of said liquid with said means to permit said first means to move said valve part to said other position.

15. Valve structure, comprising a valve part manually movable to one position for permitting the flow of liquid through a conduit, means for moving a portion of said valve to affect the flow of liquid controlled by said valve, and a dissolvable member positioned to be dissolved by the flow of liquid through said conduit and operatively connected to said last named means to cause operation of the valve by said last named means.

16. Valve control means, comprising a receptacle, a conduit for causing flow of liquid through said receptacle, and a valve member held in one position by a dissolvable member positioned in said receptacle, the dissolving of the said member causing movement of said valve member.

MELVIN SHETLER.